US009673541B2

(12) United States Patent
Zhong et al.

(10) Patent No.: US 9,673,541 B2
(45) Date of Patent: Jun. 6, 2017

(54) SPRING CLIP AND CONNECTION BOX (71) Applicant: Tyco Electronics (Shanghai) Co. Ltd., Shanghai (CN)

(72) Inventors: Yuan Zhong, Shanghai (CN); Hongjun Yin, Shanghai (CN); Ting Tao, Shanghai (CN); Feng Wang, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 14/837,916

(22) Filed: Aug. 27, 2015

(65) Prior Publication Data
US 2015/0364841 A1 Dec. 17, 2015

Related U.S. Application Data (63) Continuation of application No. PCT/IB2014/059039, filed on Feb. 17, 2014.

(30) Foreign Application Priority Data

Feb. 28, 2013 (CN) ..................... 2013 2 0091307 U (51) Int. Cl.
*H01R 4/48* (2006.01)
*H02S 40/34* (2014.01)
*H01R 43/16* (2006.01)

(52) U.S. Cl.
CPC ......... *H01R 4/4827* (2013.01); *H01R 4/4845* (2013.01); *H02S 40/34* (2014.12); *H01R 43/16* (2013.01)

(58) Field of Classification Search
CPC ..... H01R 4/4827; H01R 43/16; H01R 4/4845
USPC .......................................... 439/828–858, 424
See application file for complete search history.

(56) References Cited

U.S. PATENT DOCUMENTS

| 7,131,857 | B2 * | 11/2006 | Mueller | ............... | H01R 4/4845 |
| | | | | | 439/441 |
| 8,771,027 | B2 * | 7/2014 | Zhang | .................. | H01R 4/4809 |
| | | | | | 439/835 |
| 2006/0223385 | A1 | 10/2006 | Pavlovic et al. | | |
| 2006/0289053 | A1 | 12/2006 | Nieleck et al. | | |
| 2010/0170716 | A1 | 7/2010 | Ishida et al. | | |

OTHER PUBLICATIONS

International Search Report, International Application No. PCT/IB2014/059039, dated May 23, 2014, 4 pages.

* cited by examiner

*Primary Examiner* — Briggitte R Hammond
(74) *Attorney, Agent, or Firm* — Barley Snyder (57) ABSTRACT

A spring clip is provided and includes a main body, a gripping section, a release member, and a conductive terminal receiving passageway. The main body includes a first arm and a second arm that is bent from the first arm, such that a free end of the first arm extends towards the second arm. The gripping section is provided between the free end of the first arm and an inner surface of the second arm. The release member extends from a free end of the second arm and away from the gripping section. The conductive terminal receiving passageway is disposed along a connection portion of the first arm and the second arm, and positioned opposite to the gripping section.

16 Claims, 6 Drawing Sheets

SPRING CLIP AND CONNECTION BOX

CROSS-REFERENCE TO RELATED APPLICATIONS

This application is a continuation of PCT International Application No. PCT/IB2014/059039 filed Feb. 17, 2014, which claims priority under 35 U.S.C. §119 to Chinese Patent Application No. 201320091307.8 filed on Feb. 28, 2013.

FIELD OF THE INVENTION

The invention relates to a spring clip and, more particularly, to a spring clip for connecting a conductive sheet of a solar photovoltaic assembly and a connection box having the spring clip.

BACKGROUND

In an electronic system, for example, a solar photovoltaic assembly, communication assembly, etc., for transmitting a micro electric signal, it is necessary to transmit the micro electric signal to an electrical device disposed inside a connection box through a conductive sheet (bus bar) so as to collect or retransmit the micro electric signal. Inside the connection box, a conductive terminal for electrically connecting the conductive sheet and a connection piece connected between the conductive terminal and the electrical device are disposed.

Figure 1:
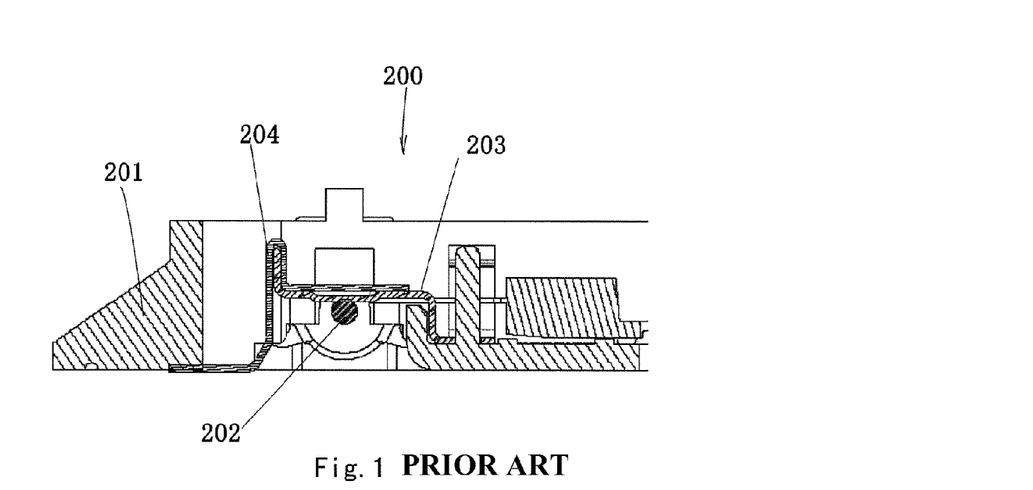
FIG. 1 is a cross sectional view of a known connection box.

With respect to FIG. 1, a conventional connection box 200 is shown and includes a housing 201, a conductive terminal 203 and a conductive sheet 204 (i.e. bus bar). A cable receiving passageway is formed in the housing 201 to introduce an external cable 202 therein. The conductive terminal 203 is electrically connected to the introduced cable 202 by, for example, soldering. The conductive sheet 204 is connected between the conductive terminal 203 and an electrical device (not shown), for example, a solar photovoltaic assembly. The conductive sheet 204 is made of a thin metal material, for example, a copper foil, and is soldered to the conductive terminal 203. Since the conductive sheet 204 is very thin, there is a possibility that a rosin joint occurs between the conductive sheet 204 and the conductive terminal 203 during soldering them, which may cause a poor electrical contact and an unstable electrical connection between them.

Furthermore, it may produce an over high contact impendence and even an electric arc between them, which creates a serious potential safety risk. Also, soldering the conductive sheet 204 to the conductive terminal 203 is very complicated and difficult, and it is difficult for them to be separated after the soldering, which is unfavorable for maintenance of the solar panel of the solar photovoltaic assembly.

SUMMARY

The invention has been made to overcome or alleviate at least one aspect of the above mentioned disadvantages, among others.

A spring clip is provided and includes a main body, a gripping section, a release member, and a conductive terminal receiving passageway. The main body includes a first arm and a second arm that is bent from the first arm, such that a free end of the first arm extends towards the second arm. The gripping section is provided between the free end of the first arm and an inner surface of the second arm. The release member extends from a free end of the second arm and away from the gripping section. The conductive terminal receiving passageway is disposed along a connection portion of the first arm and the second arm, and positioned opposite to the gripping section.

BRIEF DESCRIPTION OF THE DRAWINGS

The above and other features of the invention will become more apparent by describing in detail exemplary embodiments thereof with reference to the accompanying drawings, in which.

DETAILED DESCRIPTION OF THE EMBODIMENT(S)

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
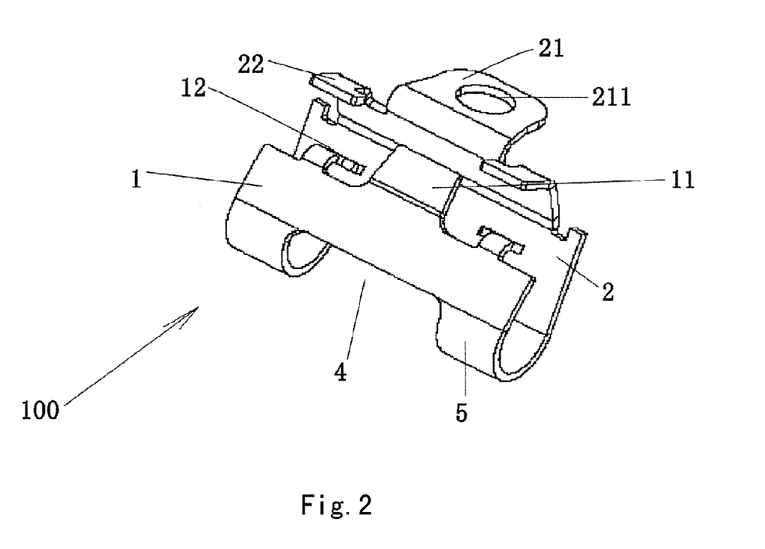
FIG. 2 is a perspective view of a spring clip according to the invention.
Figure 3:
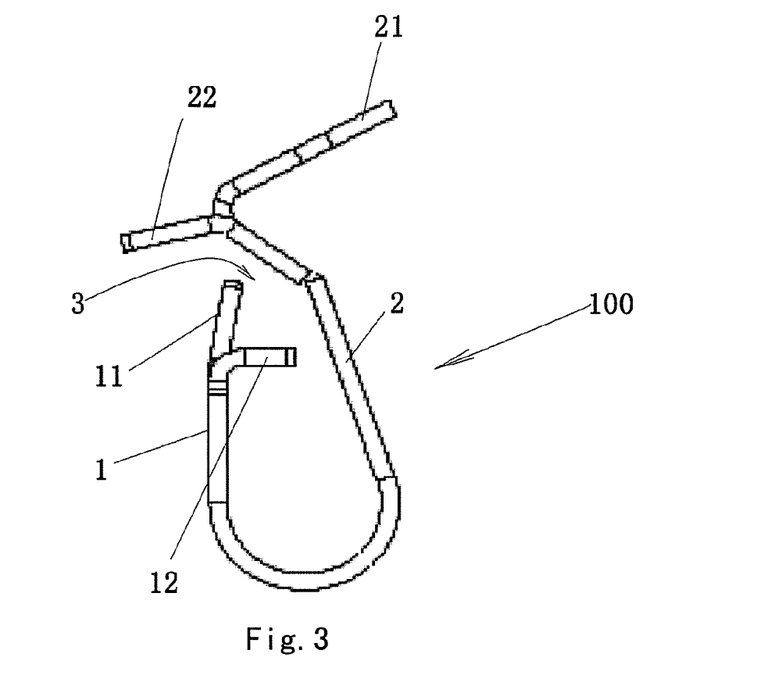
FIG. 3 is a side view of the spring clip of FIG. 2.
Figure 4:
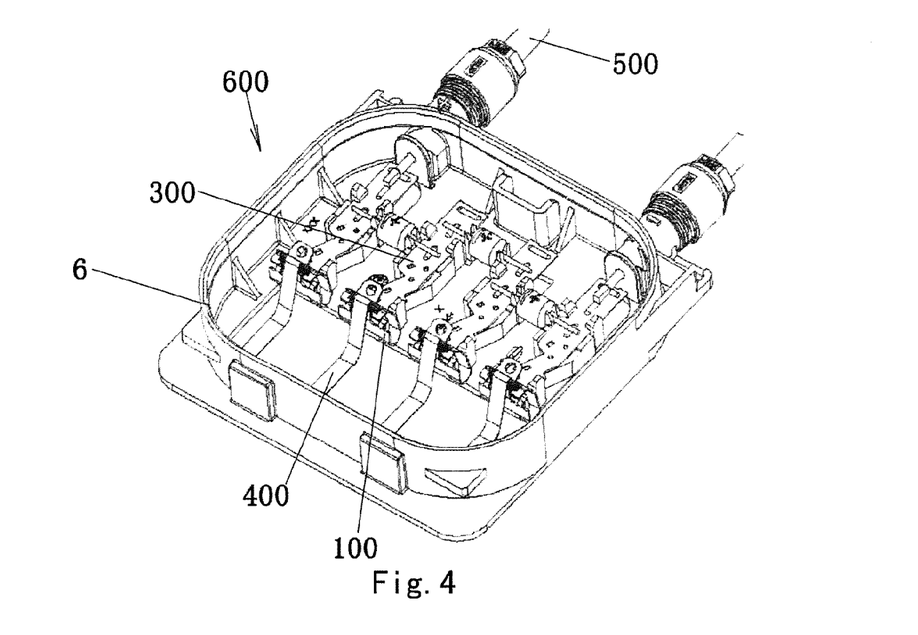
FIG. 4 is a perspective view of a connection box according to the invention showing inclusion of the spring clip of FIG. 2.
Figure 5:
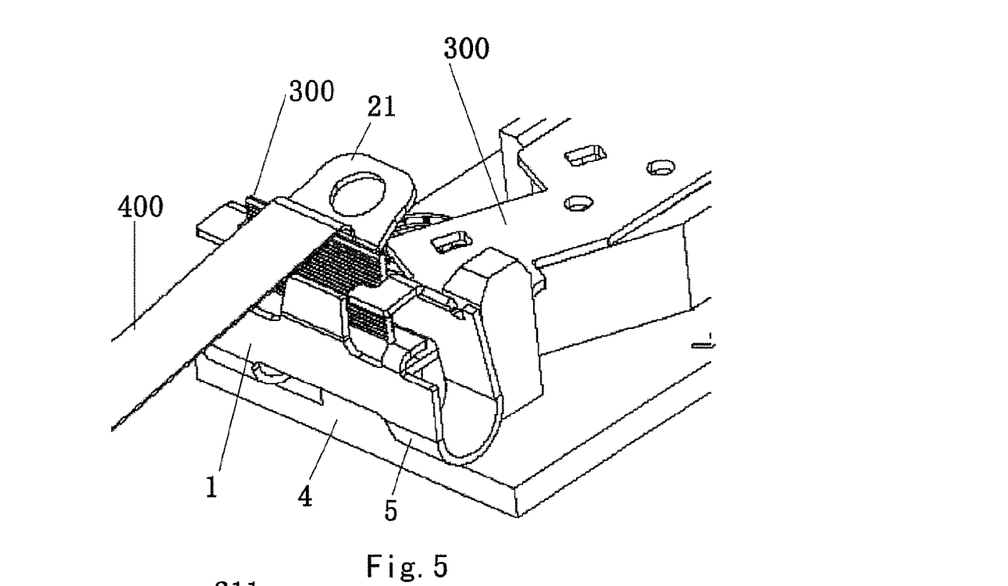
FIG. 5 is an enlarged view of the connection box of FIG. 4 showing the spring clip according to the invention.

With respect to FIGS. 2 and 3, a spring clip 100 according to the invention is shown. In an exemplary embodiment of the invention, as shown in FIGS. 2-3, the spring clip 100 is for electrically connecting a conductive sheet of an electronic system, for example, solar photovoltaic assembly, communication assembly, etc., for producing or transmitting a micro electric signal, to a conductive terminal of an electrical device inside a connection box. The electrical device processes or further transmits the micro electric signal transmitted from the conductive sheet.

As shown in FIGS. 2-3, the spring clip 100 for electrically connecting a conductive sheet 400 to a plate-shaped conductive terminal 300 includes a main body formed by bending a single spring metal sheet made of, for example, copper, copper alloy, etc. The main body includes a first arm 1 and a second arm 2. A free end 11 of the first arm 1 extends towards the second arm 2 to form a gripping section 3 together with a part of the second arm 2, and a free end of the second arm 2 extends beyond the gripping section 3 to form a release member 21 for expanding the gripping section 3. An conductive terminal receiving passageway 4 is formed in a connection portion (bottom portion in FIG. 3) 5 of the first and second arms 1, 2 opposite to the gripping section 3, so that an end of the conductive terminal 300 is capable of being inserted into the gripping section 3 through the conductive terminal receiving passageway 4 and elastically gripped by the gripping section 3.

In an exemplary embodiment, each of the portions of the spring clip 100 may be formed by machining processing, such as, cutting, punching, bending, etc., a single metal sheet made of, for example, copper, copper alloy, etc.

In an exemplary embodiment, the connection portion 5 of the first and second arms 1, 2 opposite to the gripping section 3 is formed in a substantial arc-shape, so that the gripping section 3 of the spring clip 100 can produce an enough gripping force. The gripping section 3 may be closed or have a gap in left-right direction and/or up-down direction. It should be appreciated for those skilled in this art that the gripping section 3 may be configured in any suitable shape as long as it can reliably grip the conductive terminal 300 when the conductive terminal 300 is inserted into the gripping section 3 through the conductive terminal receiving passageway 4.

Figure 6:
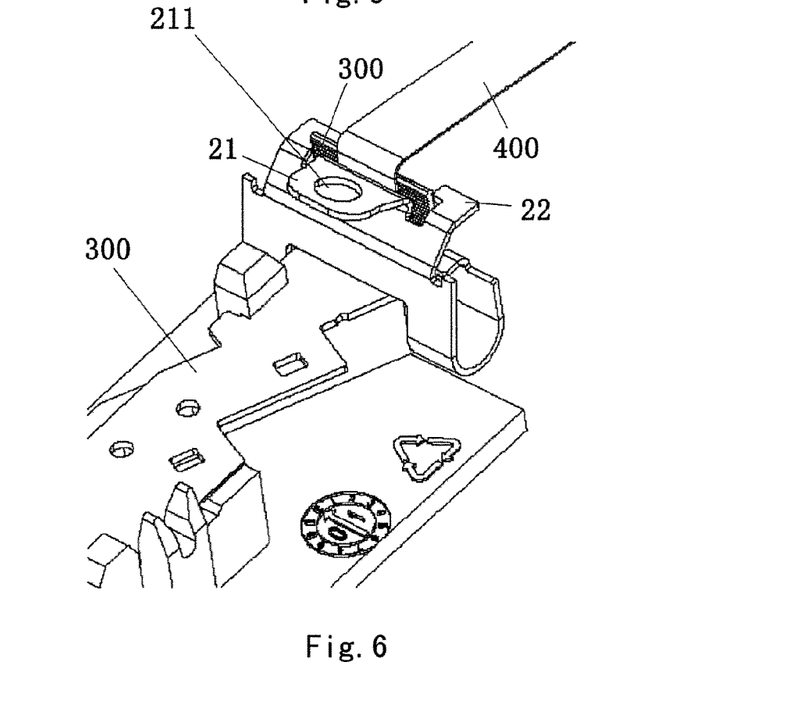
FIG. 6 is another enlarged view of the connection box of FIG. 4 showing the spring clip according to the invention;\
Figure 7:
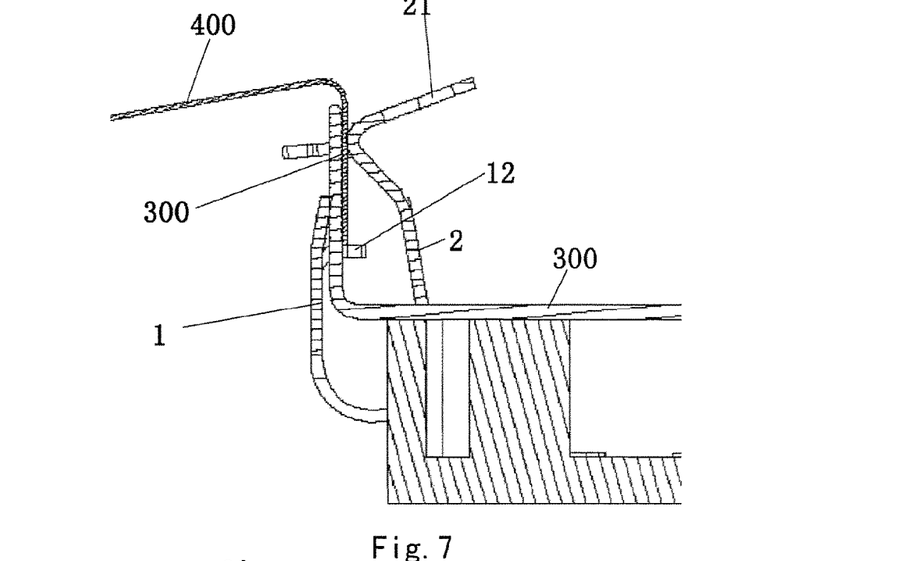
FIG. 7 is a side view of the connection box of FIG. 5.

In an exemplary embodiment of the spring clip 100, the release member 21 is formed by outwardly bending the free end of the second arm 2 at a position adjacent to the gripping section 3. Also, a tool receiving passageway 211 is formed in the release member 21. In this way, a tool, for example, a screwdriver may be inserted into the tool receiving passageway 211 to drive the release member 21 outward, so that the gripping section 3 is expanded. In this condition, the entire spring clip 100 can be mounted on the conductive terminal 300 with a portion of the conductive terminal 300 inserted into the expanded gripping section 3. When the tool is removed, the gripping section 3 is released and elastically grips the conductive terminal 300. As shown in FIG. 6, the conductive terminal receiving passageway 4 formed in the connection portion 5 may have an enough width to permit the conductive terminal 300 to enter inside the spring clip 100.

In an exemplary embodiment of the spring clip 100, as shown in FIGS. 2-3 and 6, at least a pair of positioning members 12 extending inward (toward the second arm 2) are formed on the first arm 1. The positioning members 12 are configured to hold the end of the conductive terminal 300 inserted into the spring clip 100 in place, together with the gripping section 3. In a further exemplary embodiment, each of the positioning members 12 has a substantial L-shape, and the conductive terminal 300 passes through between the paired positioning members 12. With this configuration, upon urging the release member 21 outward, the gripping section 3 and the paired positioning members 12 abut against the surface of conductive terminal 300 to prevent the spring clip 100 from being rotated. In an exemplary embodiment, the positioning member 12 extends from a portion of the upper end of the first arm 1 toward the second arm 2.

In a further exemplary embodiment of the spring clip 100, a pair of stops 22 extending inward are formed on the second arm 2, and the pair of stops 22 are configured to limit a displacement of the second arm 2. Furthermore, each of the stops 22 has a substantial L-shape and configured as a hook. The L-shaped stop 22 includes s a guide arm and a block arm. The conductive terminal 300 passes through between the guide arms of the paired stops 22 and is limited in a space defined by the pair of block arms. The block arm of the L-shaped stop 22 may extend over the surface of the conductive terminal 300 and be separated from the surface of the conductive terminal 300 by a predetermined distance. With this configuration, when the release member 21 is driven to move outward by the predetermined distance with the screw driver, the block arm of the stop 22 abuts against the surface of the conductive terminal 300 to prevent the second arm 2 from being further moved outward. As a result, the stop 22 can prevent the gripping section 3 from being incapable of returning to its original state due to being excessively expansion.

In a further exemplary embodiment, as shown in FIGS. 4-7, a connection box 600 is provide and includes a housing 6 made of, for example, plastic material, a plurality of conductive terminals 300 each mounted in the housing 6 and electrically connected to respective external cables 500, a plurality of spring clips 100 in accordance with the above described embodiments, and a plurality of conductive sheets 400. The end of the conductive terminal 300 is inserted into the gripping section 3 through the conductive terminal receiving passageway 4 of the spring clips 100 and elastically gripped by the gripping section 3. The end of the conductive sheets 400 is inserted into the gripping section 3 from a portion apposite to the conductive terminal receiving passageway 4 and is elastically gripped to the conductive terminal 300 by the gripping section 3. In order to reduce the height of the housing 6, an end of the conductive terminal 300 that is inserted into the spring clip 100 is arranged to be substantially perpendicular to the rest of the conductive terminal 300. Similarly, the end of the conductive sheet 400 is arranged to be substantially perpendicular to the rest of the conductive sheet 400. The connection box is mounted on a solar panel, and the conductive sheet 400 is used as a bus bar led out of the solar panel.

Hereafter, it will describe in detail the operation of the spring clip of the invention with reference to FIGS. 4-7.

In order to mount the spring clip 100 on the conductive terminal 300, first, the conductive terminal 300 is inserted into the gripping section 3 through the conductive terminal receiving passageway 4, while urging the release member 21 to move outward using a tool, for example, a screw driver, which is inserted into the tool receiving passageway 211. Then, the conductive terminal 300 is further inserted into the expanded gripping section 3. The screw driver is removed to return the gripping section 3 to its original state, so that the spring clip 100 is completely mounted on the conductive terminal 300 and elastically held on the conductive terminal 300.

If it is required to connect the conductive sheet 400 to the conductive terminal 300, the following steps may be performed: (1) expanding the gripping section 3 with the screw driver again, (2) inserting a portion of the conductive sheet 400 into the spring clip 100, and (3) pulling the screw driver out of the spring clip 100 to restore the gripping section 3 to its original state. In this way, the conductive terminal 300 and the conductive sheet 400 are mechanically and elastically held together by the spring clip 100.

Accordingly, the mounting of the spring clip 100 to the conductive terminal 300, the removing of the spring clip 100 from the conductive terminal 300, the connecting of the conductive sheet 400 to the conductive terminal 300 and the disconnecting of the conductive sheet 400 from the conductive terminal 300 can be easily accomplished repeatedly and performed by simply urging the release member 21 to expand the gripping section 3. Furthermore, the connecting/disconnecting of the conductive sheet 400 to/from the conductive terminal 300 can be repeatedly performed without removing the spring clip 100 from the conductive terminal 300.

Figure 8:
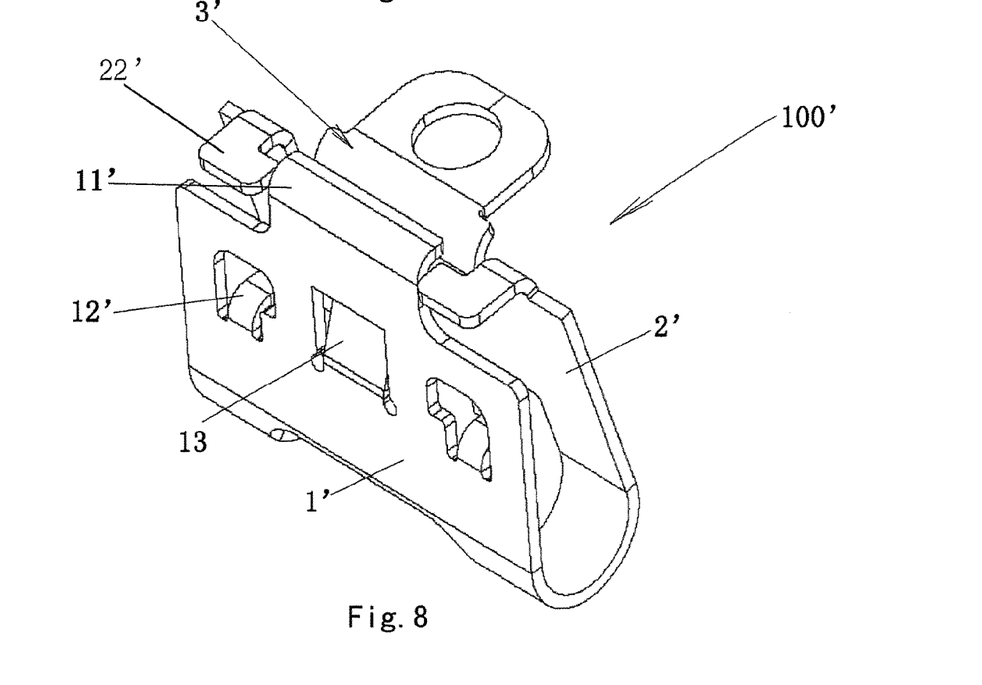
FIG. 8 is a perspective view of another spring clip according to the invention.
Figure 9:
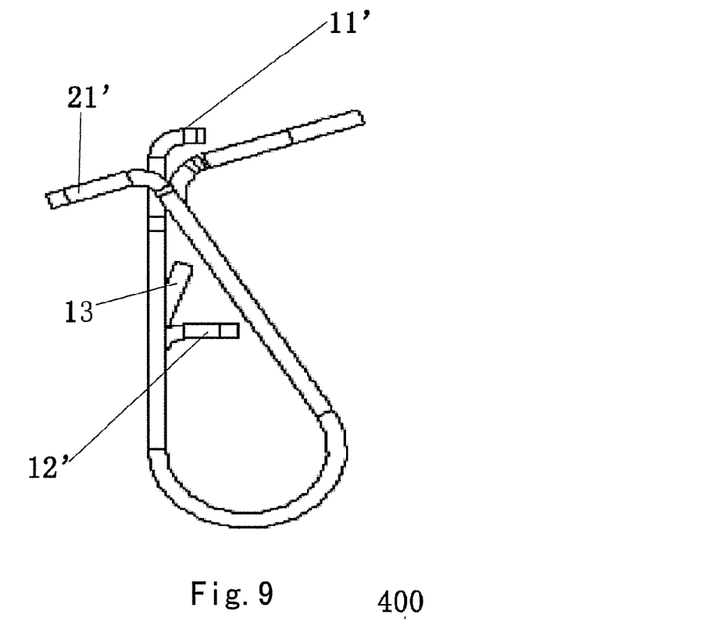
FIG. 9 is a side view of the spring clip of FIG. 8.

Now with reference to FIGS. 8-9, another spring clip 100' according to the invention is shown.

The spring clip 100' is substantially the same as the spring clip 100 as describe above, and the like reference numerals refer to the like elements. For the purpose of brevity, differences of the spring clip 100' will only be in view of the spring clip 100.

In the spring clip 100', a free end 11' of a first arm extends toward a second arm 2' to form a gripping section 3' together with a portion of the second arm 2'. The spring clip 100' further includes a stop 22' for limiting a displacement of the second arm 2' and an release member 21' for urging the first arm to move outward.

Figure 12:
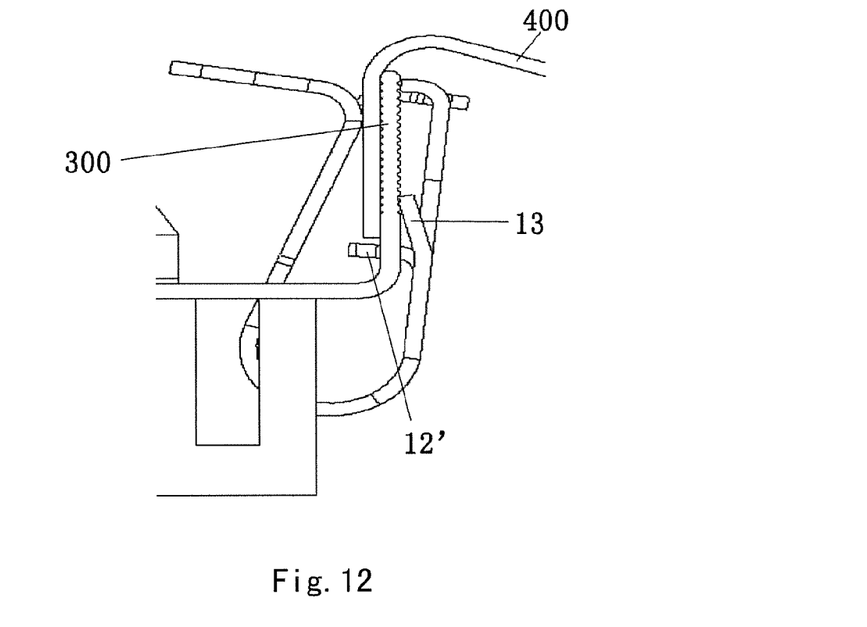
FIG. 12 is a side view of the connection box of FIG. 10.

As shown in FIGS. 8 and 12, the spring clip 100' includes a pair of spring contacts 13 extending inward is formed on the first arm. The spring contacts 13 are configured to elastically contact the surface of the conductive terminal 300. In this way, the spring clip 100' can be elastically held on the conductive terminal 300 to prevent the spring clip 100' from being separated from the conductive terminal 300. Also, the spring contacts 13 can ensure the stability of the conductive terminal 300. In an exemplary embodiment, a pair of positioning members 12' of the spring clip 100' is formed by bending inward from the surface of the first arm and each has a substantial L-shape. The positioning members 12' together with the gripping section 3' hold the conductive terminal 300 in place.

Figure 10:
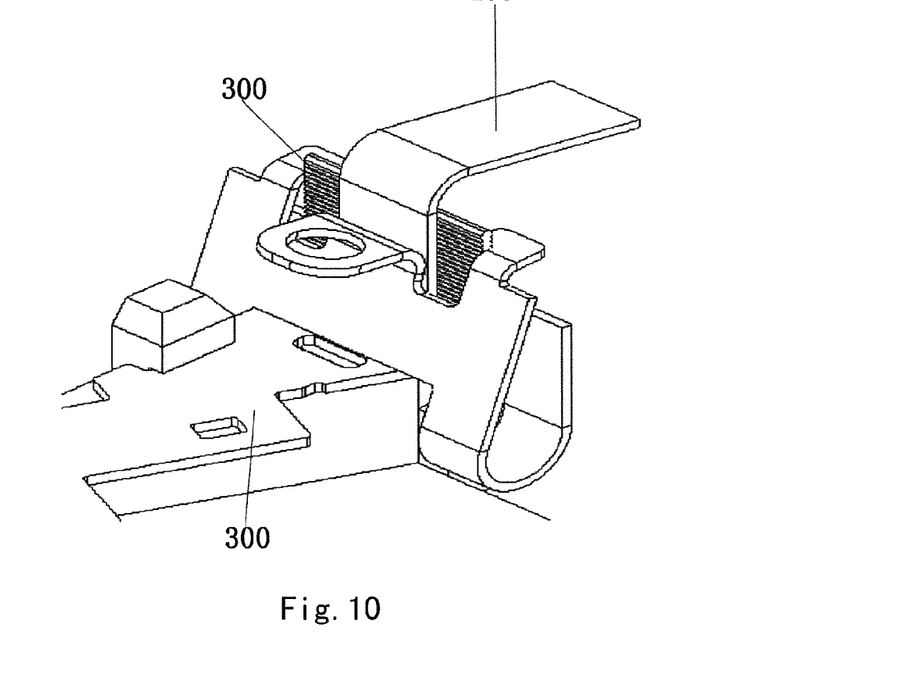
FIG. 10 is an enlarged view of the connection box in which the spring clip of FIG. 8 is mounted.
Figure 11:
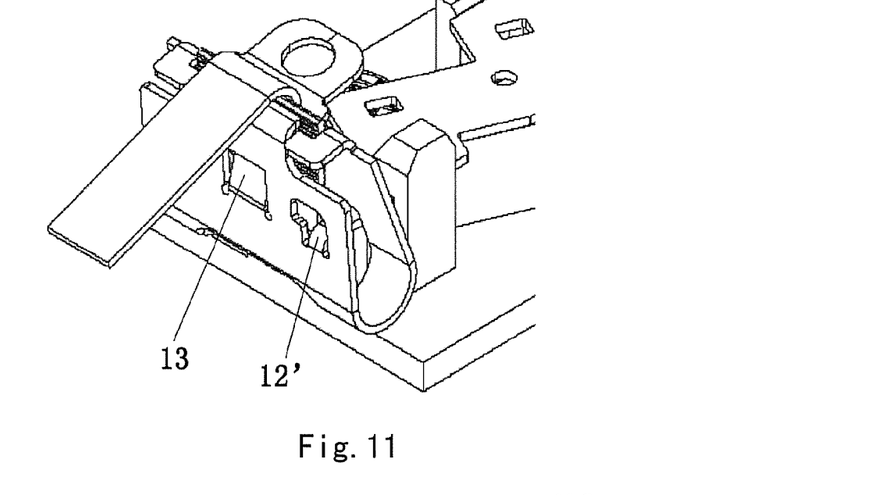
FIG. 11 is another enlarged view of the connection box in which the spring clip of FIG. 8 is mounted.

With respect to FIGS. 10-12, the spring clip 100' mounted in a connection box in order to hold the conductive terminal 300 and the conductive sheet 400 together.

In the above described embodiments of the invention, the spring clip 100 may be firstly mounted on the conductive terminal 300 inside the connection box 600, and the gripping section 3 of the spring clip 100 may be expanded by urging the release member 21 with a tool, for example, a screw driver. Then, the conductive sheet 400 may be inserted into the expanded gripping section 3 and elastically gripped to the conductive terminal 300 by the gripping section 3 in order to electrically connect the conductive sheet 400 to the conductive terminal 300, thus improving the transmission stability and quality of the micro electrical signal. Furthermore, the release member 21 can be repeatedly and simply driven for inserting/pulling the conductive sheet 400 into/out of the gripping section 3.

With the spring clip 100 according to the invention, the solar panel of the solar photovoltaic assembly can be electrically and stably connected to the connection box 600. Furthermore, the assembly of them is very simple and quickly without an additional apparatus, for example, a tin soldering device. Also, they can be repeatedly and easily assembled and disassembled, facilitating the long term maintenance of the solar panel.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle, so that more kinds of spring clip 100 can be achieved with overcoming the technical problem of the invention.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A spring clip, comprising:
    a main body having a first arm and a second arm bent from the first arm such that a free end of the first arm extends towards the second arm;
    a gripping section provided between the free end of the first arm and an inner surface of the second arm;
    a release member extending from a free end of the second arm and away from the gripping section;
    a conductive terminal receiving passageway disposed along a connection portion of the first arm and the second arm and positioned opposite to the gripping section;
    a pair of positioning members extending inward from the first arm; and
    a pair of stops extending inward from the second arm.

2. The spring clip according to claim 1, wherein the release member is outwardly bent from the free end of the second arm and positioned adjacent to the gripping section.

3. The spring clip according to claim 2, wherein the release member includes a tool receiving passageway extending there through.

4. The spring clip according to claim 1, further comprising a spring contact extending inward from the first arm.

5. The spring clip according to claim 1, wherein the first arm and the second arm are arc shaped.

6. A spring clip, comprising:
    a main body having a first arm and a second arm bent from the first arm such that a free end of the first arm extends towards the second arm;
    a gripping section provided between the free end of the first arm and an inner surface of the second arm;
    a release member extending from a free end of the second arm and away from the gripping section;
    a conductive terminal receiving passageway disposed along a connection portion of the first arm and the second arm and positioned opposite to the gripping section; and
    a pair of stops extending inward from the second arm.

7. The spring clip according to claim 6, wherein each of the pair of stops is substantially L-shaped.

8. The spring clip according to claim 7, wherein each of the pair of stops includes a guide arm and a block arm.

9. A connection box, comprising:
    a conductive terminal;
    a conductive sheet; and
    a spring clip, including
        a main body having a first arm and a second arm bent from the first arm such that a free end of the first arm extends towards the second arm,
        a gripping section provided between the free end of the first arm and an inner surface of the second arm, the conductive terminal and the conductive sheet electrically connected within the gripping section,
        a release member extending from a free end of the second arm and away from the gripping section, and a conductive terminal receiving passageway disposed along a connection portion of the first arm and the second arm and positioned opposite to the gripping section, the conductive terminal extending through the conductive terminal receiving passageway.

10. The connection box of claim 9, wherein the spring clip further includes a pair of positioning members extending inward from the first arm.

11. The connection box of claim 10, wherein the positioning members hold the conductive terminal.

12. The connection box of claim 11, wherein the conductive terminal is disposed between the first arm and a portion of each positioning member.

13. The connection box of claim 12, wherein the spring clip further includes a pair of stops extending inward from the second arm.

14. The connection box of claim 13, wherein the conductive terminal is disposed between the second arm and a portion of each stop.

15. The connection box of claim 14, wherein the conductive sheet is disposed between the second arm and a portion of each stop.

16. The spring clip according to claim 1, wherein each of the pair of positioning members is substantially L-shaped.

* * * * *